United States Patent [19]

Blanchet et al.

[11] Patent Number: 4,479,778
[45] Date of Patent: Oct. 30, 1984

[54] CONSTRUCTION OF REGENERATOR FURNACES

[75] Inventors: Pierre Blanchet, Boulogne; Joseph Recasens, Sorgues, both of France

[73] Assignee: Societe Europeenne des Produits Refractaires, Courbevoie, France

[21] Appl. No.: 451,436

[22] Filed: Dec. 20, 1982

[30] Foreign Application Priority Data

Jan. 8, 1982 [FR] France ............................ 82 00185

[51] Int. Cl.³ .................. F27D 17/00; F27D 1/16; C03B 5/00; F23D 11/44
[52] U.S. Cl. .................................. 432/180; 65/336; 431/166; 432/3
[58] Field of Search ............... 432/180, 181, 182, 183, 432/3; 65/136, 336, 337, 339, 177; 431/166, 167

[56] References Cited

U.S. PATENT DOCUMENTS

| | | | |
|---|---|---|---|
| 1,718,331 | 6/1929 | Callard | 165/9.3 |
| 1,882,992 | 10/1932 | Schwalbe | 432/22 |
| 1,941,410 | 12/1933 | Mulholland | 432/13 |
| 2,077,169 | 4/1937 | Green | 432/3 |
| 3,637,912 | 1/1972 | Bernard | 432/3 |

FOREIGN PATENT DOCUMENTS 479289  3/1916  France .
10853  of 1913  United Kingdom ............... 432/180

Primary Examiner—John J. Camby
Attorney, Agent, or Firm—Watson, Cole, Grindle & Watson

[57] ABSTRACT

The present invention is directed to a regenerator furnace which is useful in making glass, the regenerator furnace including burner pipes, each burner pipe having a generally square or rectangular cross section, the upper part or cover of each pipe being built with monolithic elements made of refractory material and of sufficient extent for each upper element to rest at its ends on the refractory elements forming port side walls, these lateral elements themselves resting on refractory elements forming the base of the pipes.

10 Claims, 7 Drawing Figures

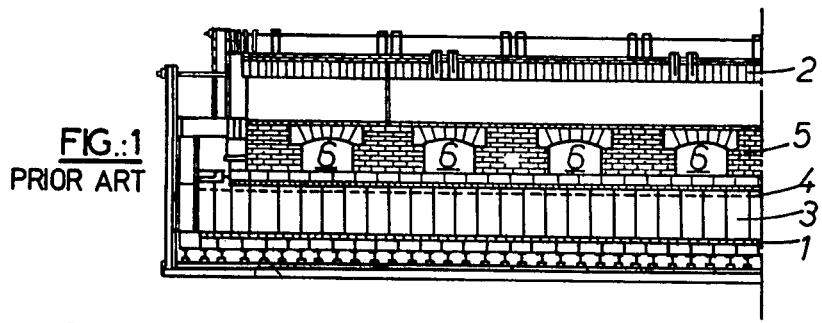
FIG.:1 PRIOR ART
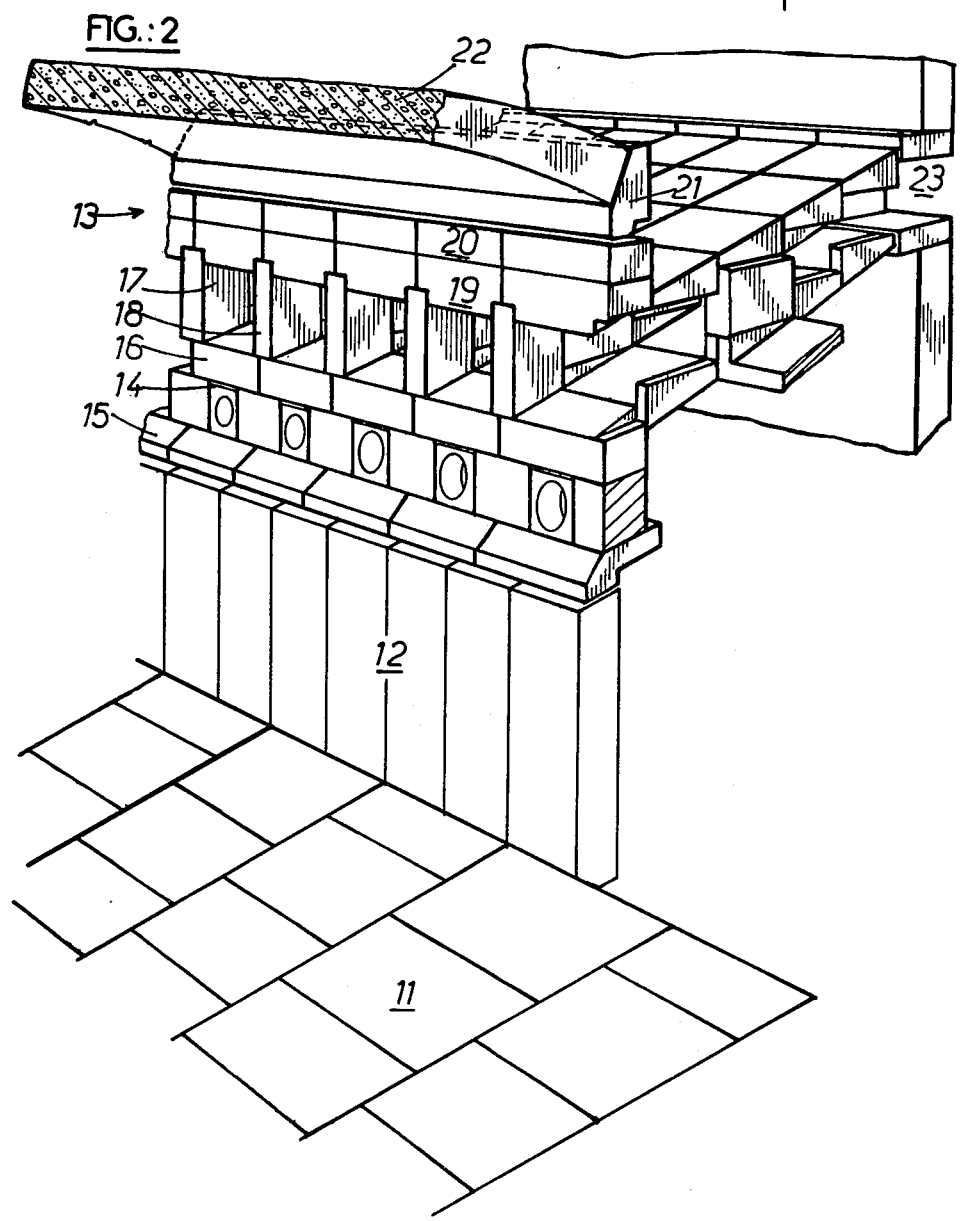
FIG.:2

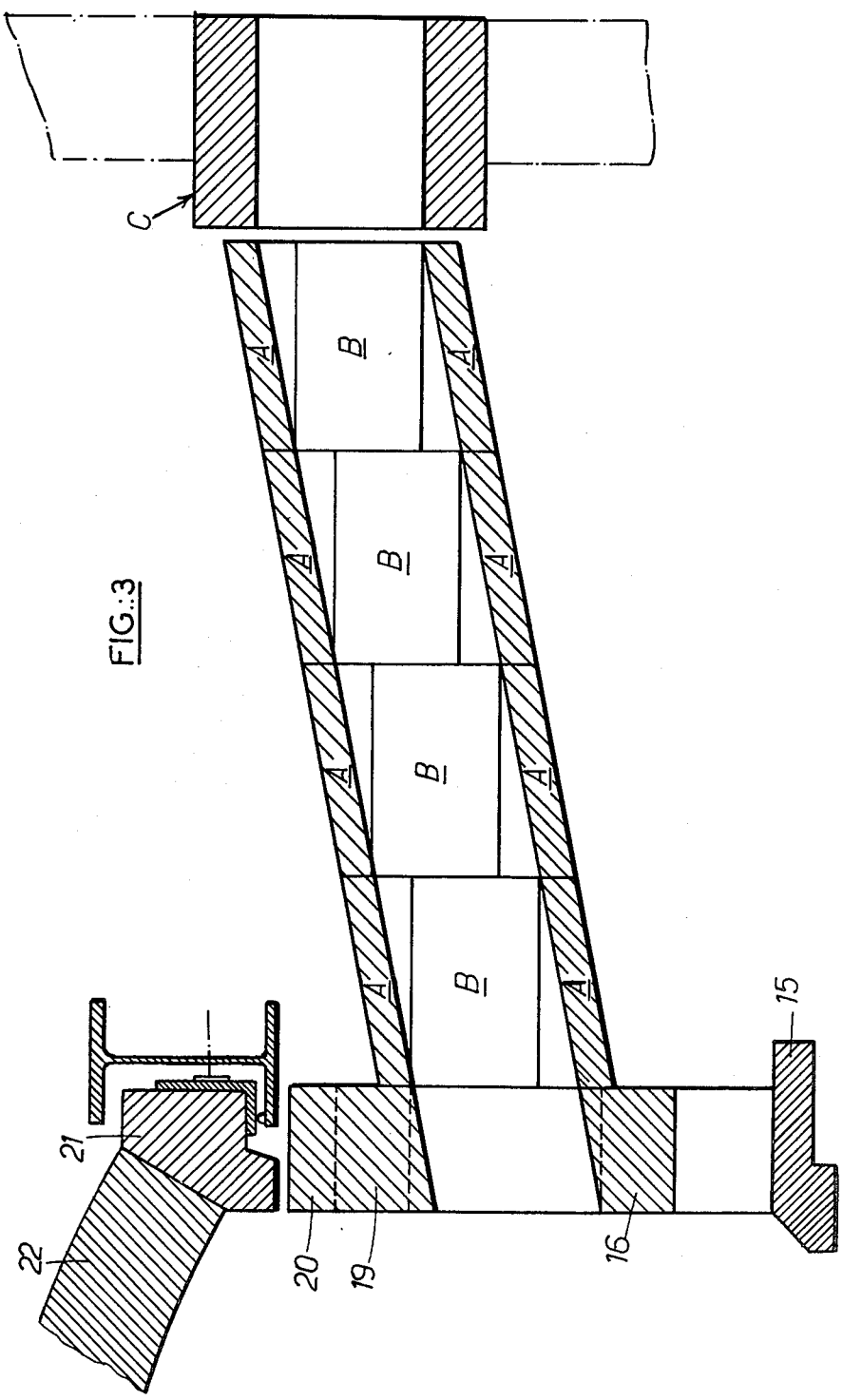

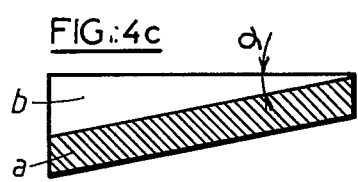
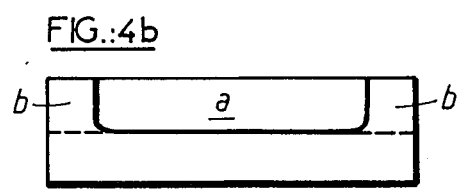
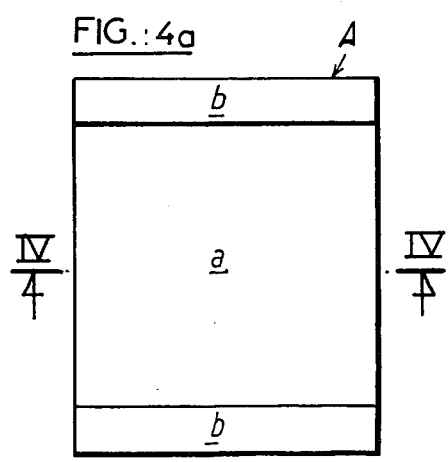

CONSTRUCTION OF REGENERATOR FURNACES

BACKGROUND OF THE INVENTION

1. Field of the Invention

The invention relates to improvements in the construction of regenerator furnaces.

2. The Prior Art

Regenerator furnaces are of two types: transverse-burner furnaces and loop furnaces.

Transverse-burner and regenerator furnaces are well known. In this type of furnace, the burners of relatively large size and in small numbers are arranged opposite one another on the sides of the furance and operate alternately, the burners on one of the sides being ignited, whilst those located on the other side are extinguished. The hot smoke escapes via the pipes of the extinguished burners and heats the regenerator stacks. After the burners have been reversed, these hot stacks are used to heat the combustion air conveyed to the burners in operation, whilst the smoke is used to heat the regenerator stack associated with the extinguished burners, and so on and so forth.

Transverse-burner and regenerator furnaces are used especially in glass-making, particularly in large production units for bottles or sheet glass.

In transverse-burner and regenerator furnaces, the combustion air arrives in the furnace via masonry burner pipes which are connected to the upper parts of the regenerators. A certain number of injectors located under the burner platform, in its vault or on the sides, allow the intake of fuel (gas or heavy fuel oil). The flames are of the asymmetric "diffusion flame" type, the air and the fuel arriving separately at a certain angle relative to one another.

This conventional technology has a certain number of disadvantages which can be summarized as follows:

The masonry burner pipes are separated from one another by dead spaces which can reach two meters and sometimes more. Since the flames develop approximately over the width of these pipes, the result is that only some of the surface of the glass bath is covered by the flames, usually 30 to 45%.

Now the heat exchange and therefore the combustion efficiency, and consequently the consumption of the furnace, depend on this percentage covered by the flames.

The flames radiate over the part of the regenerators which is located above the stacks.

This is because of a relatively large solid angle of the burner pipes (these widen from the furnace towards the regenerator). The heat lost in this way represents approximately 3% of the perceptible heat of the smoke, but in contrast to the latter it is, so to speak, unrecoverable.

The construction of the burner pipes is complicated: a keyed vault, heavy reinforcements, etc.

This makes it necessary to use, for assembly, a large and specially trained labour force as well as suitable equipment (arches). Moreover, these pipes are very difficult to insulate, and the "edge effect" plays an appreciable part in the heat losses.

The width of the penetrations of these pipes in the regenerators is small in comparison with the total length of the walls which receive these penetrations. This results in many dead spaces and poor distribution of the smoke in the stacks, and consequently lowers the efficiency of the regenerators.

Finally, because of the reduced number of burners of relatively high power, the pipes are geometrically unsuitable for the furnace chamber, thus causing poor distribution of the fluids (air, fuel) which, in turn, entails a lowering of efficiency which is all the greater because the chamber is large.

Transverse-burner and regenerator furnaces have relatively high fuel consumptions, typically of the order of 1,300 kcal per kg of gas.

Because of the increasing cost of petroleum products, there is a constant need for an improvement in the thermal efficiency of furnaces so as to reduce their fuel consumption.

As regards loop furnaces, these comprise two burners, each equipped with one or more fuel injectors, the two burners being placed next to one another on one and the same side as the furnace. Each burner operates in turn, and the flame coming from a first burner develops along a horseshoe-shaped path, returning towards the second burner, thus forming a loop. The smoke escapes via the pipe of the latter and passes through a regeneration chamber, losing in contact with the stack some of the heat which it contains. When it is the turn of the second burner to operate, the combustion air heats up in contact with the stack, and the flame, following a path contrary to the preceding one, develops up to the first burner, the smoke in turn heating the stack associated with the first burner, and so on and so forth. This type of furnace is economical (a consumption typically of the order of 1,100 kcal/kg of glass), but has a more restricted capacity than transverse-burner furnaces. The burner pipes of these furnaces are constructed in a way similar to that used for the pipes of transverse-burner and regenerator furnaces, that is to say with a keyed vault.

Loop furnaces are generally used for the production of bottles.

The present invention is directed to making improvements to the construction of regenerator furnaces.

SUMMARY OF THE INVENTION

The invention relates, more particularly, to regenerator furnaces of the types mentioned above, the burner pipes of which each have, in cross-section, a general square or rectangular shape, the upper part or cover of each pipe being built with monolithic elements made of refractory material and of sufficient extent for each upper element to rest at its end on the refractory elements forming the port side walls, these lateral elements themselves resting on refractory elements forming the base of the pipes. Advantageously, the elements forming the port side walls of two consecutive pipes are common to these two pipes in the case of transverse-burner furnaces.

The refractory elements preferably have plane surfaces and simple shapes.

The burner pipes according to the invention will generally be of a size substantially less than that of conventional burner pipes. On the other hand, because of the method of construction employed, it is possible to use a much larger number of burners for a given furnace length. For example, whereas a conventional transverse-burner and regenerator smelting furnace with a length of 10 to 13 meters and a width of 6 to 8 meters usually has 4 to 6 pairs of burners, a smelting furnace according to the invention, of similar size, will have 15 to 20 pairs of burners. The fact that the burners according to the invention can be arranged close to one another offers an important technical advantage, namely that it makes it possible to ensure a flame covering rate of at least 55%, preferably at least 60%.

By "flame covering" is meant the surface of the bath (molten glass) covered by the flames emerging from the burners, assuming that each flame has the width of the burner from which it has emerged and a length equal to the width of the bath. In actual fact, the flames have a slightly divergent form, and the true flame covering is greater than that calculated in accordance with the hypothesis mentioned above.

The method of constructing the burner pipes according to the invention is simpler than a keyed-vault construction and can be carried out quickly by means of elements with plane surfaces and of relatively simple shape and with less qualified labour than in the keyed-vault method which requires the use of arches and a specially trained labour force. Moreover, such a construction of simpler shape allows more thorough insulation than the conventional construction (simpler shape, fewer edges), a better distribution of the smoke in the heads (free upper parts) of the chambers of the regenerators, and consequently an improvement in the efficiency of the regenerators as well as a reduction in the losses resulting from radiation from the laboratory (the space above the molten glass) towards the chamber heads as a consequence of the closing of the solid angle, the base of which is the total surface of penetration in the chamber and the radius of which is the length of the burner pipes.

The improvements of the invention allow fuel savings of the order of 5 to 10% to be made on transverse-burner and regenerator furnaces.

The main advantages described for the transverse-burner furnaces are also applicable to loop furnaces, with the exception of the increase in the flame covering rate. The problems of reinforcing the burners are simplified considerably. By adjusting the heights of intermediate small posts (lateral elements), it is possible to act on the distribution of secondary air between the longitudinal axis and the tip of the furnace, and this can be advantageous in the case of a loop furnace.

The following description made with reference to the attached drawings and given by way of non-limiting example will make it easy to understand how the invention can be put into effect, the particular features emerging both from the drawing and from the text naturally forming part of the invention.

DESCRIPTION OF THE DRAWINGS

FIG. 1 is a partial view, in longitudinal section, of a glass furnace of conventional construction.

FIG. 2 is a partial view in perspective of a glass furnace improved according to the invention.

FIG. 3 is a view in longitudinal section of a burner pipe of the furnace of FIG. 2.

FIGS. 4a, 4b and 4c are top, end and side views respectively of one of the refractory elements forming the upper and lower parts of the burner pipe of FIG. 3.

DESCRIPTION OF THE PREFERRED EMBODIMENT

Figure 5:
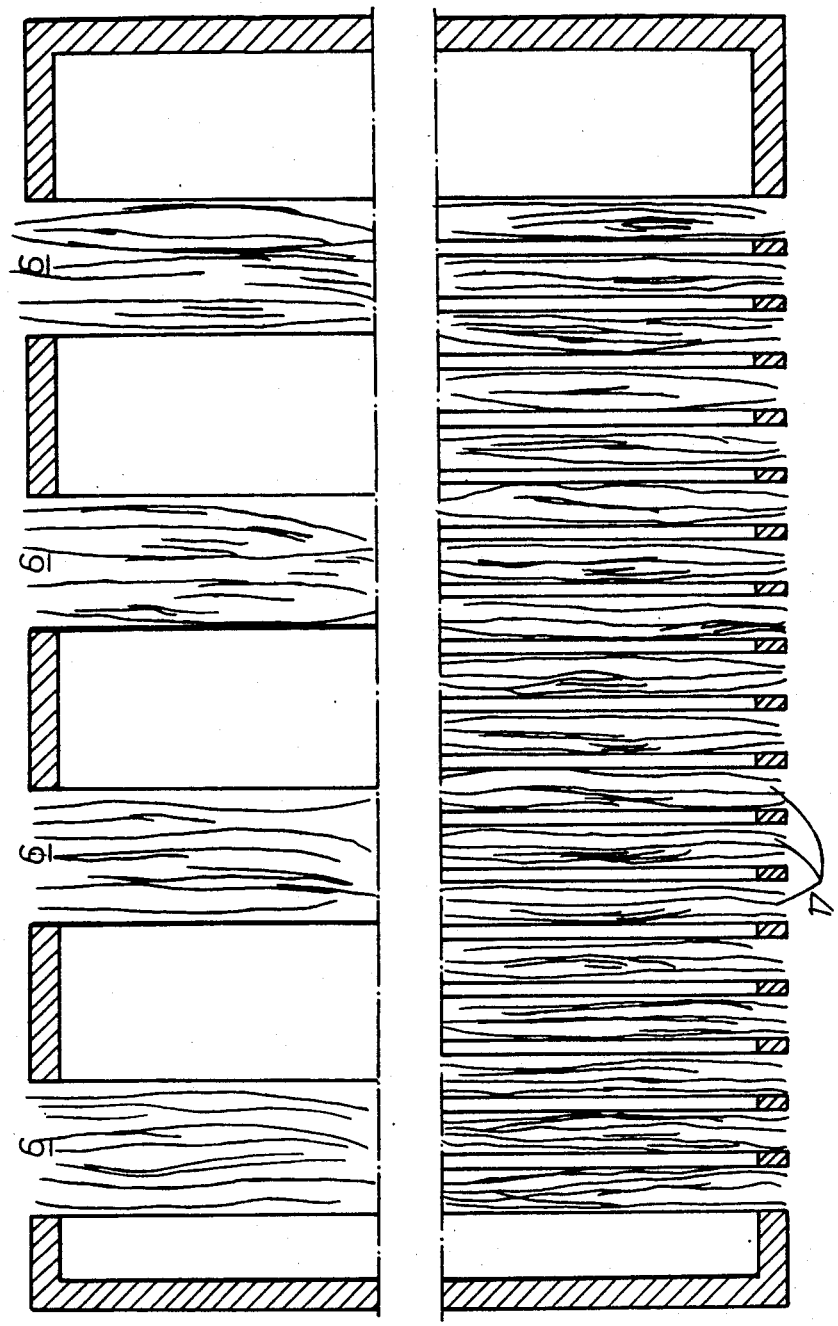
FIG. 5 is a diagrammatic view comparing the flame coverings of the furnaces of FIGS. 1 and 2.

FIG. 1 illustrates a transverse-burner glass furnace of conventional construction. This furnace comprises a hearth 1, and arch 2, a lateral tank wall 3 located below the glass line 4, and a lateral superstructure wall (pier) 5 located above this line. Masonry smoke pipes 6 are provided along the superstructure 5 and open into the heads of the regenerators (not shown). Injectors (not shown) located in the vault of the pipes, under the pipes or on their sides, allow the intake of fuel (gas or heavy fuel oil). The flames are of the asymmetric "diffusion flame" type, the air and fuel arriving separately at a cetain angle relative to one another. The pipes 6 are arched. For a furnace, the fusion tank of which has a length of approximately 10 meters and a width of approximately 7 meters, there are typically four pipes 6 on each of the sides of the superstructure. The width of each pipe is typically 1.3 meters for a height of the order of 0.5 meter.

In this type of conventional furnace:

the masonry pipes 6 are separated from one another by substantial dead spaces, which means that the flame covering of such a furnace is relatively low, i.e., of the order of 43%, as illustrated in FIG. 5, upper part, as a result of which the heat exchange between the flames and the glass, and therefore the combustion efficiency are poor, entailing a relatively high furnace consumption;

the flames radiate strongly over the part of the regenerator which is located above the stacks as a result of the relatively large solid angle of the pipes 6 which widen from the furnace towards the regenerator. The heat loss in this way is, in practice, unrecoverable;

the construction of the smoke pipes is complicated: a keyed vault, heavy reinforcements, etc. Furthermore, these pipes are difficult to insulate, and the "edge effect" plays an appreciable part in the heat losses;

the width of penetration of the smoke pipes in the regenerators is low in comparison with the total length of the walls receiving them. This results in many dead spaces and poor distribution of the smoke in the stacks of the regenerators, and consequently lowers the efficiency of the latter.

FIG. 2 shows a part of a furnace which is improved according to the present invention, the fusion tank of which is of a size similar to that of the furnace of FIG. 1. This furnace comprises a hearth 11, a lateral wall 12 delimiting the tank and formed by refractory blocks and a superstructure 13. The superstructure 13 comprises at its base injector blocks 14 resting on nose bricks 15, a platform 16, and burner pipes 17 provided above the platform and separated from one another by small posts 18 (lateral elements). Located in the upper part of the superstructure are lintels 19, complementary elements 20 and a stringer 21 supporting the vault 22. The pipes 17 open in their rear part into a regenerator head 23. It is appropriate to note that the refractory elements forming the platform 16 and the lintels 19 are identical. This furnace has eighteen identical burner pipes on each of its sides, only five of these pipes being shown for the sake of convenience. These pipes have a rectangular cross-section (width 0.4 meters; height 0.45 meters) approaching a square, constant over their entire length. It would, however, be possible to provide an increase in cross-section of the pipes, in a vertical direction, in the vicinity of the penetrations C in the heads (FIG. 3). The width of the small posts 18 is 0.15 meters. The pipes 17 are inclined, for example 11°, relative to the horizontal, so that the heated combustion air arriving via the pipes 17 impinges the stream of fuel injected via the injectors 14 and allows combustion of the latter. The flames are of the asymmetric "diffusion flame" type, as in the conventional furnace.

FIGS. 3 and 4 illustrate in a more detailed way the construction of the burner pipes. The base and the cover of each of these pipes are formed by means of monolithic refractory elements A, such as that illustrated in detail in FIGS. 4a, 4b and 4c. These elements have a plane central part a and two wings b in the form of right-angled triangles and perpendicular to the central part. The small angle α of the triangle is, for example, equal to 11°. Refractor lateral elements or small posts B of parallelepipedic shape form port side walls, coming to rest on the wings b of the elements A of the base and supporting the wings b of the elements A of the cover. The small posts B are arranged in alignment with the small facade posts 18 and behind these.

The furnace according to the invention has a flame covering much greater than that of the conventional furnace. This covering is approximately 63%, as illustrated in FIG. 5, the lower part.

This improvement in the flame covering results in an improvement in the heat exchanges with the bath of molten glass and makes it possible to reduce the consumption of the furnace.

Moreover, the furnace according to the invention can be constructed more simply and more quickly than a conventional furnace, since it does not require the use of the arches needed for making the keyed vaults. In fact, for constructing the burner pipes, the invention makes use of only a small number of elements of simple and standardised shape.

Further advantages are:
  the possibility of much more thorough insulation because of a simpler shape and the presence of fewer edges;
  a better distribution of the smoke in the heads of the regenerators and therefore an improvement in the efficiency of the latter;
  a reduction in the losses resulting from radiation from the hearth towards the heads because of the closing of the solid angle, the base of which is the total surface of penetration in the chamber and the radius of which is the length of the pipes. The luminous flux in the pipes of a furnace according to the invention is equal to approximately half the luminous flux in a conventional furnace.
  an increase in the number of injectors (fuel oil or gas), making it possible to control the flame lengths better and, if necessary, to increase the maximum limit of the heat flow.

It goes without saying that the embodiment described is only an example and that it would be possible to modify it, especially by substituting technical equivalents, without thereby departing from the scope of the invention.

In particular, the type of furnace according to the invention could also be used in metallurgy.

We claim:

1. In a regenerator furnace which comprises a hearth, a vault extending over the hearth, a lateral wall extending upwardly from the hearth toward the vault and a lateral superstructure wall extending upwardly from the lateral wall to the vault, a regenerator head behind the lateral superstructure wall, at least two burner pipes extending from the regenerator head to the lateral superstructure wall so as to communicate with the area between the hearth and the vault, and fuel-injecting means cooperating with the burner pipes, the improvement wherein each burner pipe has a generally rectangular cross section and includes refractory base elements and monolithic refractory cover elements, and wherein a common refractory port side wall is located between adjacent burner pipes, the common refractory port side wall resting on the refractory base elements of adjacent burner pipes and supporting the refractory cover elements of adjacent burner pipes, said base elements and said cover elements being of sufficient extent to span the distance between adjacent port side walls.

2. The regenerator furnace as defined in claim 1 wherein said burner pipes extend from said regenerator head to said lateral superstructure wall at a downwardly inclined angle.

3. The regenerator furnace as defined in claim 2 wherein said downward angle is about 11° below horizontal.

4. The regenerator furnace as defined in claim 1 wherein each said base element comprises a planar center part and two lateral wings, said lateral wings extending perpendicularly upwardly from opposite sides of said central part and being shaped as right-angled triangles.

5. The regenerator furnace as defined in claim 4 wherein each said cover element comprises a planar center part and two lateral wings, said lateral wings extending perpendicularly downwardly from opposite sides of said central part and being shaped as right-angled triangles.

6. The regenerator furnace as defined in claim 1 wherein a separate fuel-injecting means is provided in said lateral superstructure wall to communicate with the area between said hearth and said vault below each said burner pipe.

7. The regenerator furncace as defined in claim 1 which is a transverse-burner and regenerator furnace.

8. The regenerator furnace as defined in claim 7 wherein said burners are sufficiently close together to provide a flame covering rate of at least 55%.

9. The regenerator furnace as defined in claim 8 wherein said flame covering rate is at least 60%.

10. The regenerator furnace as defined in claim 1 which is a loop furnace.

* * * * *